(12) United States Patent
Pimentel

(10) Patent No.: US 8,816,222 B2
(45) Date of Patent: Aug. 26, 2014

(54) STRAIN RELIEF DEVICE

(75) Inventor: Nelson Goncalves Pimentel, Neuss (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/881,978

(22) PCT Filed: Nov. 8, 2011

(86) PCT No.: PCT/US2011/059761
§ 371 (c)(1),
(2), (4) Date: Apr. 26, 2013

(87) PCT Pub. No.: WO2012/074685
PCT Pub. Date: Jun. 7, 2012

(65) Prior Publication Data
US 2013/0233615 A1    Sep. 12, 2013

Related U.S. Application Data

(60) Provisional application No. 61/417,569, filed on Nov. 8, 2011.

(51) Int. Cl.
*H02G 3/00* (2006.01)
*G02B 6/44* (2006.01)
*H02G 15/007* (2006.01)

(52) U.S. Cl.
CPC ............... *H02G 3/26* (2013.01); *G02B 6/4477* (2013.01); *H02G 15/007* (2013.01)
USPC ........ 174/650; 174/72 A; 174/74 R; 385/137; 385/147; 439/449

(58) Field of Classification Search
USPC ...... 174/650, 659, 664, 668, 652, 72 A, 73.1, 174/74 R, 77 R, 152 G, 153 G; 385/135, 136, 385/137, 69, 70, 147, 86; 439/470, 455, 439/449, 460; 16/2.1, 2.2
See application file for complete search history.

(56) References Cited

U.S. PATENT DOCUMENTS 4,684,211 A * 8/1987 Weber et al. .................. 385/136
5,000,536 A * 3/1991 Anderson et al. ............... 385/69
(Continued)

FOREIGN PATENT DOCUMENTS

DE       3826474       2/1990
DE     102007052562   10/2008
(Continued)

OTHER PUBLICATIONS

International Search Report for International PCT Application No. PCT/US2011/059761, mailed on Jan. 16, 2013, 4 pages.

*Primary Examiner* — Angel R Estrada
(74) *Attorney, Agent, or Firm* — Janet A. Kling

(57) ABSTRACT

A strain relief device is disclosed that allows the passage of at least one telecommunication cable therethrough. The exemplary strain relief device has a one-piece, rectangular tubular body, an external strength member securing section to secure strength members from the at least one telecommunication cable to the rectangular tubular body and a sealing member to provide an environmental seal between the at least one telecommunication cable and the strain relief device and between the strain relief device and a mounting structure into which the strain relief device is inserted. The rectangular tubular body has an outer surface and at least one cable channel extending between a first end of the rectangular tubular body and a second end rectangular tubular body.

14 Claims, 6 Drawing Sheets

(56) References Cited

U.S. PATENT DOCUMENTS

| | | | |
|---|---|---|---|
| 5,073,044 A * | 12/1991 | Egner et al. | 385/86 |
| 5,567,174 A | 10/1996 | Ericson, Jr. | |
| 6,389,214 B1 * | 5/2002 | Smith et al. | 385/136 |
| 7,270,485 B1 * | 9/2007 | Robinson et al. | 385/136 |
| 7,371,106 B2 * | 5/2008 | Nad | 439/470 |
| 7,505,666 B2 | 3/2009 | Benedetto | |
| 8,039,745 B2 * | 10/2011 | Sedor et al. | 174/74 R |
| 8,369,679 B2 * | 2/2013 | Wakileh et al. | 385/147 |
| 2010/0092147 A1 | 4/2010 | Desard | |
| 2010/0111484 A1 | 5/2010 | Allen | |
| 2012/0142212 A1 | 6/2012 | Lyons, Jr. | |

FOREIGN PATENT DOCUMENTS

| | | |
|---|---|---|
| GB | 2438654 | 12/2007 |
| WO | WO 2008-048935 | 4/2008 |
| WO | WO 2010-062336 | 6/2010 |
| WO | WO 2010-102657 | 9/2010 |
| WO | WO 2012-074684 | 6/2012 |

* cited by examiner

STRAIN RELIEF DEVICE

BACKGROUND

1. Field of the Invention

The present invention generally relates to an environmentally sealed strain relief device for use in a telecommunication enclosure, and more particularly to a device for securing up to two telecommunication cables in an industry standard footprint.

2. Description of the Related Art

Cables, such as telecommunication cables and electrical power distribution cables, are ubiquitous and used for distributing electrical power and all manner of data signals across vast networks. The majority of cables are electrically conductive cables (typically copper), although the use of optical fiber cables is growing rapidly in telecommunication systems as larger and larger amounts of data are transmitted. As cables are routed across power or data networks, it is necessary to periodically open, connect, or splice the cable so that power or data may be distributed to other cables or "branches" of the network. The cable branches may be further distributed until the network reaches individual homes, businesses, offices, and so on.

At each point where the cable is opened, it is necessary to protect the exposed interior of the cable. Commonly, a telecommunication enclosure is used that has one or more entry portions through which cables enter and/or exit the enclosure. The capacity of the enclosure will vary depending upon the number of entry portions in the enclosure, the sizes of the entry portions, the number of cables entering the enclosure, and the sizes and number of cables passing through each entry portion will vary. Often, when smaller diameter cables are used in distribution lines, multiple cables are bundled for placement through a single entry portion. This is particularly common where multiple smaller cables are routed from a single point to multiple locations, such as individual homes, buildings, offices, etc.

Many telecommunication enclosures, racks and cabinets include a standard telecommunication patch panel for making service connections through either a connector-socket type of connection or through a connector-to-connector connection utilizing a standard adapter or coupling such as an SC format coupling used to interconnect two SC style connectors in an optical network.

For example, in premise installations, a wall mount box or enclosure is usually employed to receive communication devices. Frequently, this type of enclosure is located in basements, communication closets, or service hallways of office buildings, professional suites, hospitals, apartment buildings and the like. Regardless of the number of cables entering the enclosure, it is often desirable or necessary to provide an environmental cable seal around the cables to prevent the ingress of moisture, dust, insects, and the like into the enclosure.

Conventional cable sealing techniques include bundling cables with mastic materials, rubber-like tapes, self-vulcanizing tapes, gels, potting compounds, and the like. The quality of the resulting seal is highly dependent upon the skill of the installer. Thus, the reliability of the seal can be inconsistent from one installer to another. Further, as the number of cables increases, it becomes more difficult to form a reliable environmental seal.

To address the disadvantages of seals formed with mastic and rubber-like tape, pre-formed grommets have been used to expand the capacity of cable entry portions of a telecommunication enclosure. Typically, the grommets are designed to fit within a nonstandard entry portion of an enclosure, and can have a predetermined number of holes sized to accept multiple smaller diameter cables.

A need exists for a sealed strain relief device which has an industry standard footprint. Having a single industry standard strain relief device would simplify the number of parts which are inventoried to install a given portion of a telecommunication network. In addition, the strain relief device should provide a reliable environmental seal around the telecommunication cable regardless of the number of cables installed in the device. Finally, the strain relief device should also allow subsequent addition of another cable without disturbing the previously installed cables.

SUMMARY

The present invention is directed to a strain relief device for use in a telecommunication enclosure to provide strain relief and an environmental seal for telecommunication cables entering the enclosure. The strain relief device allows the passage of at least one telecommunication cable.

The exemplary strain relief device has a one-piece, rectangular tubular body, an external strength member securing section to secure strength members from the at least one telecommunication cable to the rectangular tubular body and a sealing member to provide an environmental seal between the at least one telecommunication cable and the strain relief device and between the strain relief device and a mounting structure into which the strain relief device is inserted. The rectangular tubular body has an outer surface and at least one cable channel extending between a first end and a second end of the rectangular tubular body.

The exemplary strain relief device can further include a pair of clips disposed on opposite sides of the outer surface of the rectangular tubular body to secure the strain relief device into a standard sized opening in a mounting structure such as a telecommunication patch panel or an entry portion of a telecommunications enclosure.

In one exemplary aspect, the sealing member of the strain relief device can be of a single contiguous construction wherein the sealing member includes a frame portion disposed on the outer surface of the rectangular tubular body and a number of inner sealing rings disposed in the cable channels passing through the strain relief device. The frame portion provides an environmental seal between the strain relief device and a mounting structure into which the strain relief device is inserted while the inner sealing rings provide an environmental seal between the strain relief device and the cables passing therethrough.

In some exemplary embodiments, the rectangular tubular body is symmetric around a midplane of the strain relief device.

In an exemplary aspect, the rectangular tubular body of any of the previously described strain relief devices can be configured to have the same dimensions and shape as an industry standard SC-format optical connector coupling. In an alternative exemplary aspect, the rectangular tubular body of any of the previously described strain relief devices can be configured to have the same dimensions and shape as a standard LC-format optical connector coupling, while in yet another alternative exemplary aspect, the rectangular tubular body of any of the previously described strain relief devices can be configured to have the same dimensions and shape as a standard RJ-11 or RJ-45 receptacle.

Any of the previously described strain relief devices can also include a pair of abutment ridges formed on the outer surface of two opposite sides of the rectangular tubular body to facilitate mounting the retention device in an industry standard mounting structure.

BRIEF DESCRIPTION OF THE DRAWINGS

The present invention will be further described with reference to the accompanying drawings, wherein.

Figure 1A:
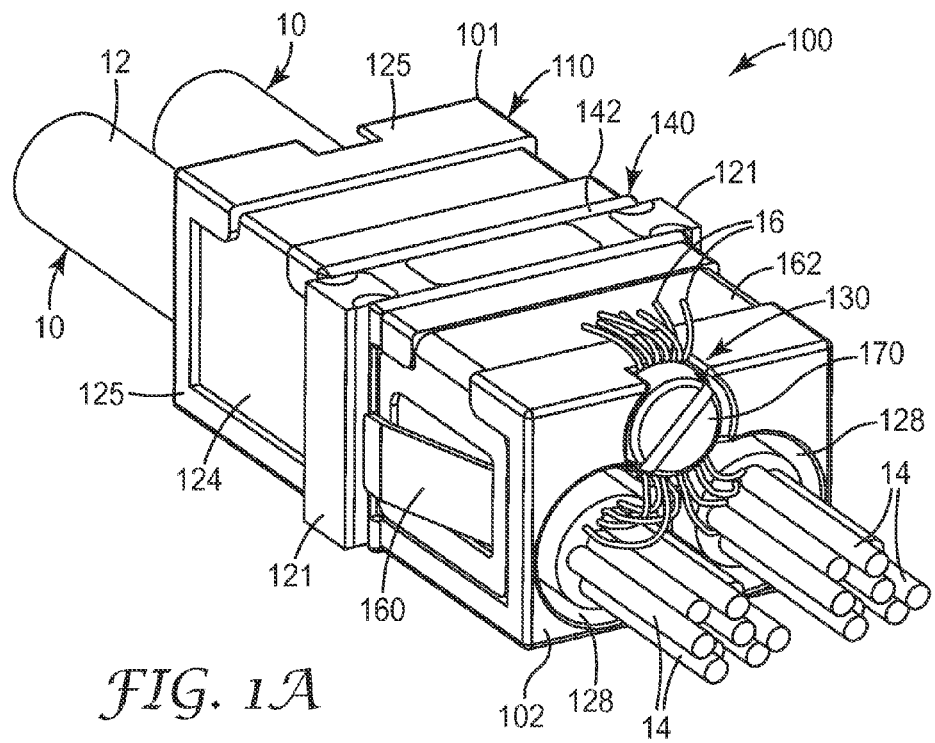
FIGS. 1A-1C are three alternative views of an exemplary strain relief device according to the current invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to a strain relief device for use in a telecommunication enclosure or patch panel to provide strain relief and an environmental seal (e.g. protection against the ingress of moisture, dust, bugs, etc.) for telecommunication cables entering the enclosure or passing through the patch panel. Further, the exemplary strain relief device can be mounted in a standard mounting structure used in telecommunication enclosures, racks and cabinets. The mounting structure can be a patch panel, wall of an enclosure, or partition configured to accept an industry standard connection receptacles and/or couplings, such as an RJ connector socket or receptacle, or a SC or LC format optical connector coupling. Mounting structures of these types generally have openings to accept industry standard connection receptacles or couplings. These industry standard connection receptacles or couplings accept terminated telecommunication cables, i.e. telecommunication cables having a connector mounted on the terminal end of the cable. The connector can be plugged in to the industry standard connection receptacles or couplings to make a connection with signal carriers (e.g. wires or terminated optical fibers) disposed on the opposite side of the mounting structure.

Exemplary telecommunication cables can be small diameter cables designed to carry telecommunication signals such as optical fiber drop cables, low fiber count optical fiber cables, electrical cables such as low pair count telecommunication drop cables, ethernet cables, or micro-coax cables or small diameter optical/electrical hybrid cables, etc. In particular, the exemplary strain relief devices can be used in conjunction with cables having either flexible or semi-flexible strength members.

As described herein, the exemplary strain relief devices are depicted for use with optical fiber telecommunication cables, although it is understood that the exemplary devices may be used with other telecommunication types without departure from the invention. An exemplary optical fiber cable 10, as shown for example in FIGS. 1A-1B, and 5A-5B, has an outer jacket 12 surrounding one or more optical fibers 14 and one or more flexible strength members 16. Typical optical fiber cables can be optical fiber drop cables or low fiber count fibers having between one and 8 optical fibers or can be relatively low count fiber cables having 8, 12, or more optical fibers contained within the cable's outer jacket. The optical fibers can be disposed individually within a loose buffer tube or in the form of an optical fiber ribbon(s). In some exemplary cables, the optical fibers can reside in the buffer tube surrounded by a water-blocking gel or grease. Each optical fiber has a polymeric coating that surrounds and protects the glass fiber. The flexible strength members can be aramid or metallic strength members or glass yarn. Aramid strength members can be in the form of a floss, a yarn, a braid, or a string. Metallic strength members can be in the form of a wire, a braid, a foil or a thin elongated strip.

Figure 1B:
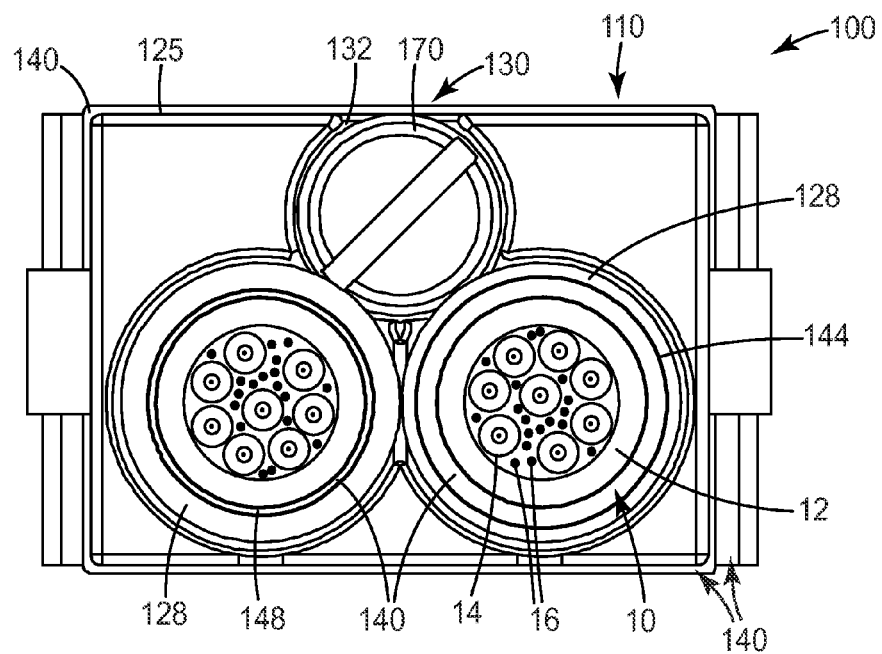
Figure 1C:
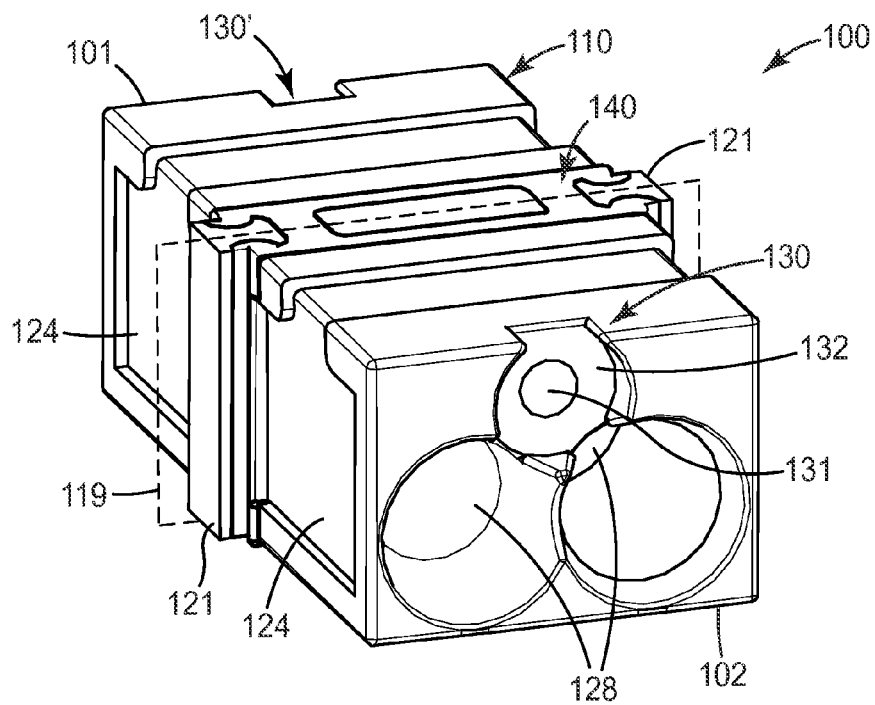

FIGS. 1A-1C illustrate an exemplary embodiment of a strain relief device 100. The exemplary strain relief device has a one-piece rectangular tubular body 110. The rectangular tubular body 110 includes an outer surface 125 and two cable channels 128 extending between a first end 101 and a second end 102 of the rectangular tubular body. The strain relief device has a midplane 119 that bisects the rectangular tubular body 110 perpendicular to the cable channels 128 passing through the rectangular tubular body as shown in FIG. 1C.

The rectangular tubular body can include a pair of abutment ridges 121 formed on the outer surface 125 on at least two sides of the rectangular tubular body to facilitate mounting the retention device in an industry standard mounting structure. In an exemplary aspect, the abutment ridges can be integrally formed along the midplane of the rectangular tubular body. In an alternative aspect, the abutment ridges can be larger to allow sufficient room for a mechanical fastener to pass through the abutment ridges to provide a more robust connection to the mounting structure. In this aspect, the sealing member may need to be extended along at least one face of the abutment ridge to provide a seal around the mechanical fastener when this alternative strain relief device is attached to a mounting structure.

Strain relief device 100 shown in FIG. 1A has two telecommunication cables, (e.g. optical fiber cables 10) installed therein. The optical fiber cables shown each contain eight optical fibers 14 and a plurality of aramid strength members 16 within cable jacket 12. In an alternative aspect, each of optical fiber cables can have more or less than eight optical fibers. With minor modifications to the design of the sealing member, the exemplary strain relief device can accommodate two optical fiber cables having a diameter between 1 mm and 5 mm.

The strength members 16 of the optical fiber cables can be secured to the rectangular tubular body by a mechanical fastener such as screw 170 in the external strength member securing section 130 formed at the second end 102 of the exemplary strain relief device. The mechanical fastener can be seated in a hole 131 situated within a recess 132 formed in the outer surface 125 of rectangular tubular body such that the strength members 16 are trapped between the mechanical fastener and the outer surface of the strain relief device when the screw is tightened down into the hole. In an exemplary aspect, the rectangular tubular body can be symmetric about its midplane 119 having an external strength member securing section 130, 130' formed at each end of the tubular housing as shown in FIG. 1C.

In an exemplary aspect shown in FIGS. 1A-1C, strain relief device 100 further includes a sealing member 140 to provide an environmental seal between the at least one telecommunication cable 10 and the strain relief device and between the strain relief device and a mounting structure (200 in FIG. 6) into which the strain relief device is inserted. In an exemplary aspect, sealing member 140 is of a single contiguous construction.

Exemplary strain relief device 100 can be formed by a two step injection molding process. First, a rigid material such as a rigid engineering plastic or glass filled polymer is used to form the rectangular tubular body 110 followed by the injection of an elastomeric or rubber material to form sealing member 140. Exemplary materials for the rectangular tubular body can include a polycarbonate material such as LEXAN® 500 Resin available from SABIC Innovative Plastics (Pittsfield, Mass.), MAKROLON® 2405 FBL Polycarbonate Resin available from Bayer Material Science LLC (Pittsburg, Pa.), MAKROLON® 9415 Polycarbonate Resin-Flame-Retardant, 10% Glass-Fiber-Reinforced Grade available from Bayer Material Science LLC (Pittsburg, Pa.), or a blend of semi-crystalline polyesters such as a XENOY® resin both available from SABIC Innovative Plastics (Pittsfield, Mass.). Exemplary materials for the sealing member can include rubber materials or thermoplastic elastomers such as are available from Kaiburg TPE (Mumbai, India). In an alternative aspect, an injection molded rectangular tubular body can be fitted with a separate internal sealing member such as an o-ring or other elastomeric grommet within each of the cable channels in the strain relief device and an external sealing member fitted around the external perimeter of the device.

Figure 3B:
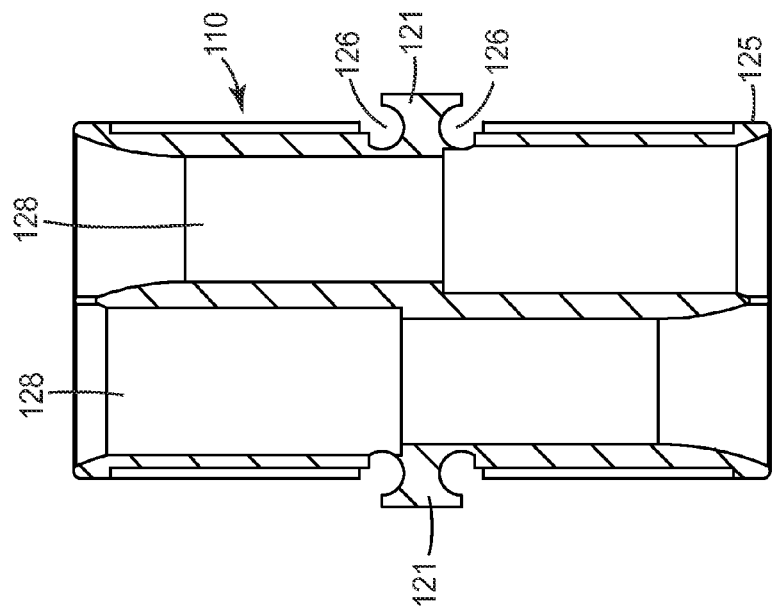
FIGS. 3A and 3B are two cross sectional views of the rectangular tubular body of the exemplary strain relief device of FIG. 1A.
Figure 3A:
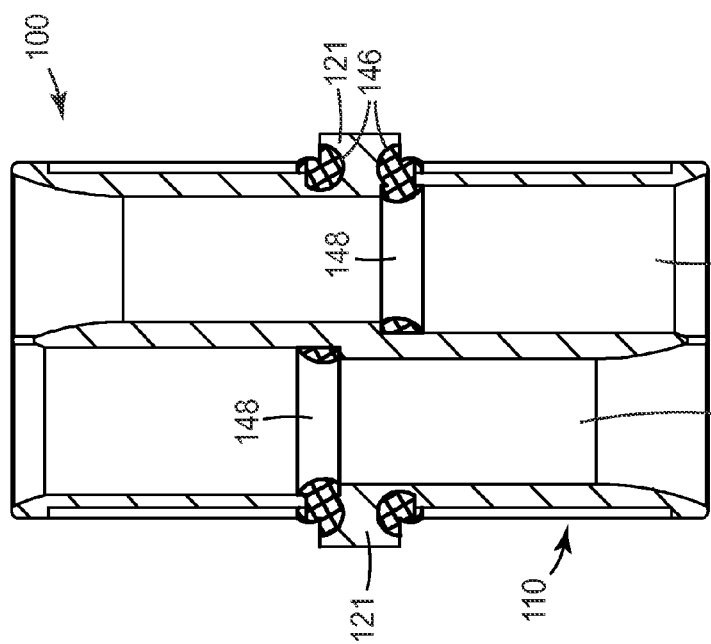
Figure 4A:
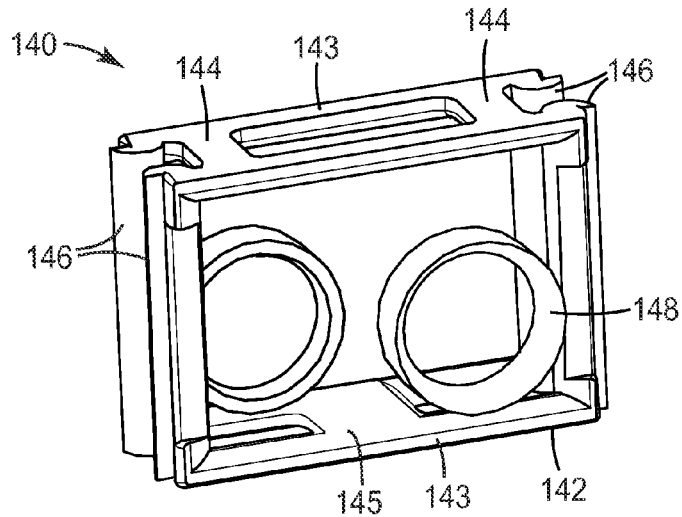
FIGS. 4A-4C are three views of an exemplary sealing member for use in the relief device of FIG. 1A.
Figure 4B:
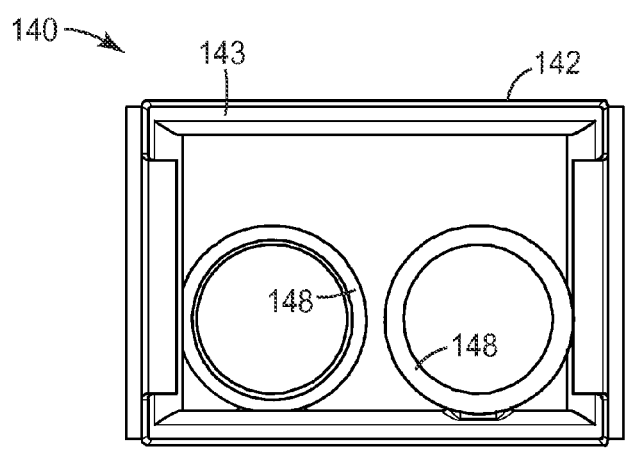
Figure 4C:
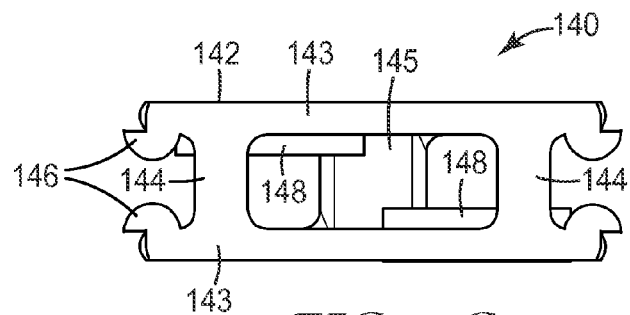

Referring to FIGS. 4A-4C, sealing member 140 includes a frame portion 142 which is disposed on the outer surface 125 (FIGS. 1A-1B) of rectangular tubular body and a number of inner sealing rings 148 disposed in and corresponding to the number of cable channels 128 passing through the rectangular tubular body 110. The frame portion 142 enables the creation of an environmental seal between the strain relief device and a mounting structure (200 in FIG. 6) into which the strain relief device is inserted while the inner sealing rings 148 provide an environmental seal between the strain relief device and the cables passing therethrough. The frame portion of sealing member 140 comprises two generally rectangular casing portions 143 held in a spaced apart relationship by separators 144, 145. Referring to FIGS. 3A, 4A and 4C, additional stability can be provided to the frame portion of sealing member 140 by anchor potions 146 which intermate with channels 126 (shown in cross section in FIG. 3B) formed in the outer surface 125 of rectangular tubular body 110 adjacent to abutment ridges 121. The inner sealing rings can be attached to frame portion 142 along one edge of at least one of the casing portions 143. In the embodiment of the sealing member shown in FIGS. 4A-4C and 3A, the inner sealing rings 148 are disposed in an offset arrangement with one inner sealing ring attached to each of casing portions 143.

Referring back to FIG. 1A, strain relief device 100 can also include a pair of clips 160 disposed on opposite sides of the outer surface 125 to secure the strain relief device into an opening in a standard telecommunication mounting structure. The clips can be in the form of a separate part that can be fitted into a depression 124 in the outer surface 125 and proximate to an end 101, 102 of the rectangular tubular body. Alternatively, the clips can be integrally formed with the rectangular tubular body.

In an exemplary aspect the rectangular tubular body can be symmetric about its midplane 119 such that the rectangular tubular body includes depressions 124 for accepting a pair of clips proximate to both the first and second ends 101, 102 of the strain relief device. In an exemplary aspect the pair of clips can be formed in as single piece joined by a spanning section 162. Thus, the pair of clips can be in the form of a clasp that secures the clips to the rectangular tubular body without additional means of fixation. In an alternative aspect, the pair of clips could be attached to the rectangular tubular body via an interference fit of each clip 160 within its respective depression 124. In another alternative aspect, the clips can be connected to the rectangular tubular body by a mechanical fastening method such as a mechanical fastener (e.g. a screw or staple) or mechanical interlocking means such as a projection formed on at least one of the clip or within the depression 124 that lock into a hole in the other of the depression or the clip or the clips could be slid into slots formed along two opposite sides of the depressions. Finally, the clips could be adhesively bonded within the depressions to secure them to the rectangular tubular body.

The clips 160 for exemplary strain relief device 100 can be metallic spring clips made of aluminum or stainless steel, for example, or can be integrally molded of the same material as the base of the strain relief device.

Figure 2:
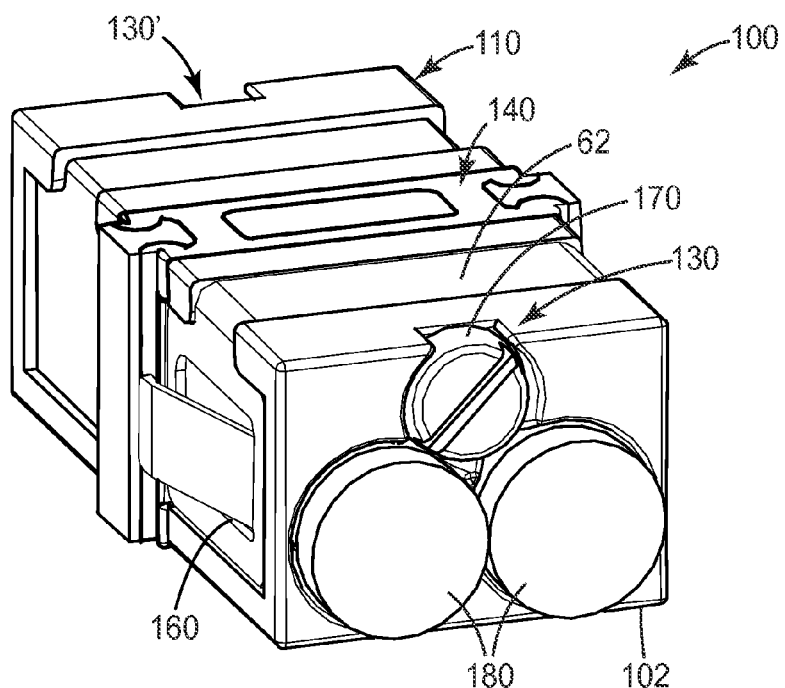
FIG. 2 is an alternative isometric view of the exemplary strain relief device of FIG. 1A having two plugs installed therein.

FIG. 2 shows exemplary strain relief device 100 having two plugs 180 inserted into the cable channels that pass through the rectangular tubular body. This enables the exemplary strain relief device to be installed in a mounting structure in a rack, cabinet or enclosure prior to the introduction of the telecommunication cables. When a cable needs to be introduced, the plug can be removed and the telecommunication cable inserted in its place.

In an exemplary aspect, the rectangular tubular body 110 of the exemplary strain relief device 100 can be configured to have the same external dimensions and shape as a standard SC-format optical connector coupling. In an alternative exemplary aspect, the rectangular tubular body of the exemplary strain relief device can be configured to have the same external dimensions and shape as a standard LC-format optical connector coupling. In yet another alternative exemplary aspect, the rectangular tubular body of the exemplary strain relief device described strain relief devices can be configured to have the same external dimensions and shape as a standard RJ-11 or RJ-45 receptacle.

Figure 5A:
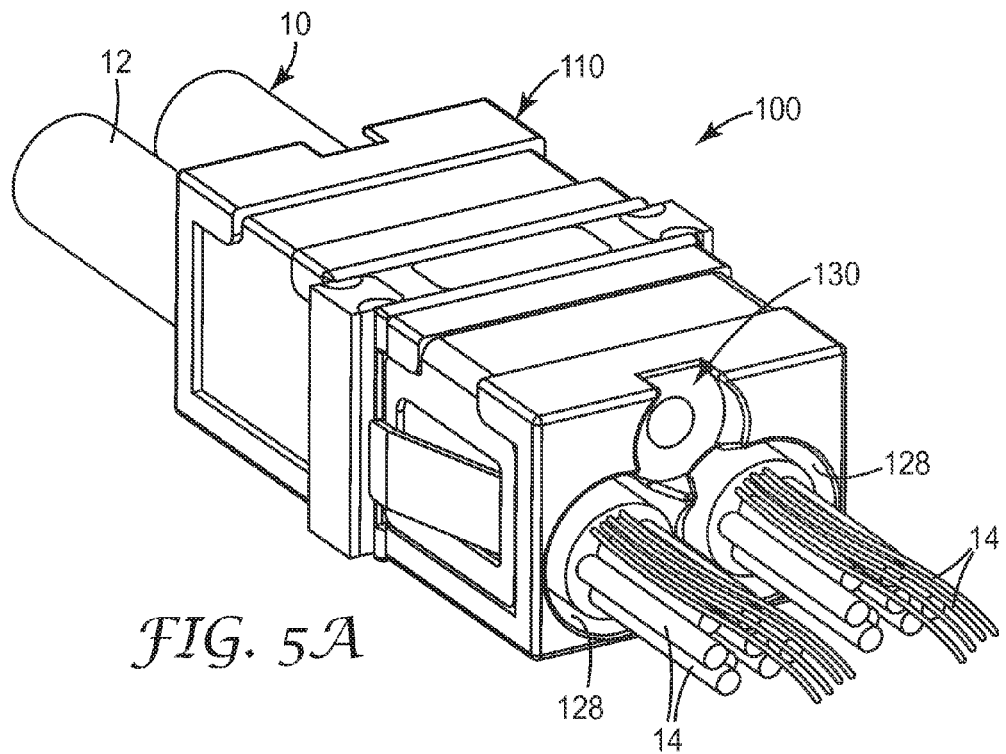
FIGS. 5A-5B show an exemplary assembly technique of a strain relief device according to an aspect of the invention.
Figure 5B:
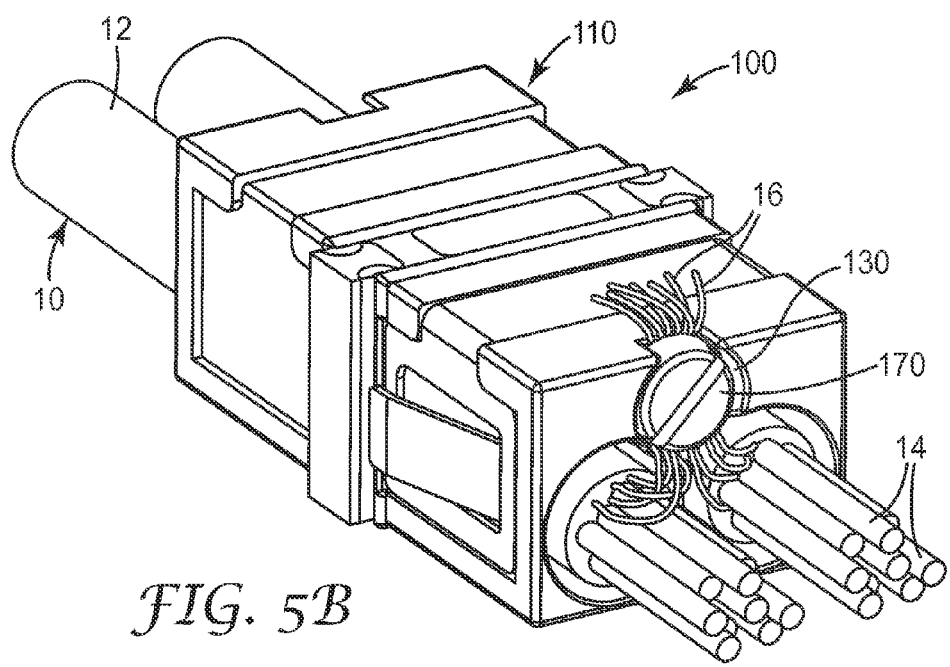

FIGS. 5A-5B illustrate a first assembly process for installing two optical fiber cables 10 into an exemplary strain relief device 100. The optical fiber cables are prepared by removing the cable jacket from a portion of the optical fiber. Each optical fiber cable is inserted through one of the cable passages 128 as shown in FIG. 5A. The strength members 16 of the optical fiber cables 10 are folded and captured in external strength member securing section 130. The strength members are secured to the rectangular tubular body by a mechanical fastener, such as screw 170. Any excess length of the strength members may be trimmed away.

Figure 6:
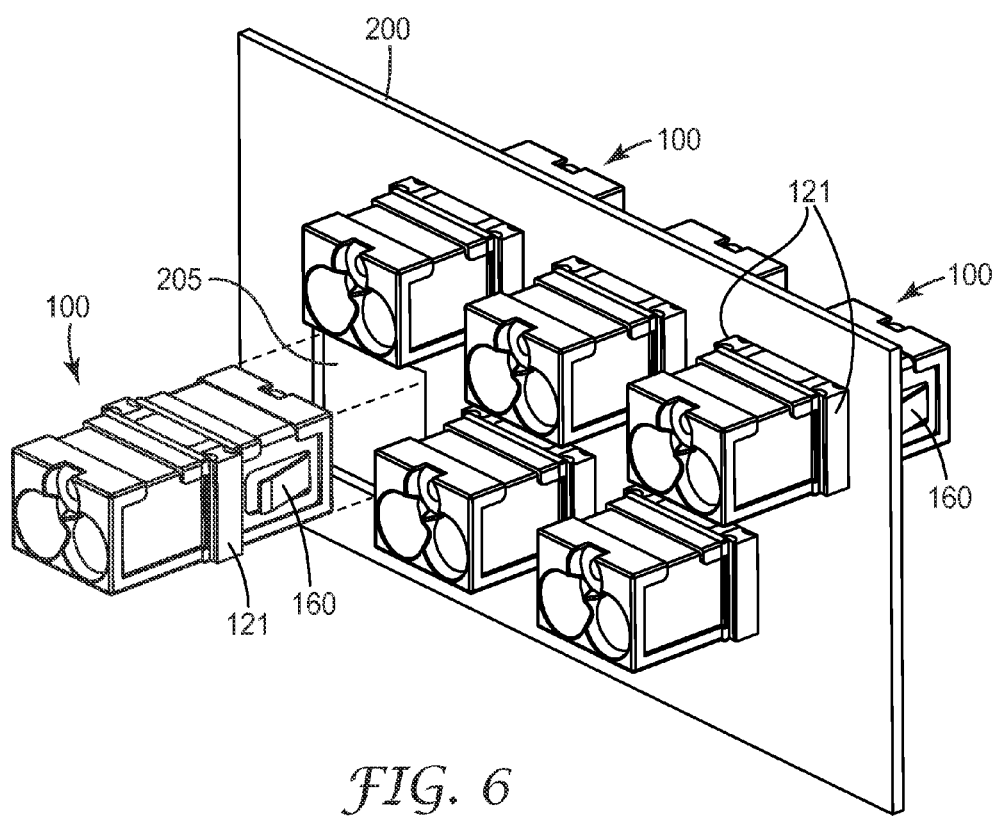
FIG. 6 is an isometric view of an exemplary strain relief device according to an aspect of the invention mounted in an alternative mounting structure.

FIG. 6 shows a plurality strain relief devices 100 according to an aspect of the invention mounted in a mounting structure 200. The exemplary strain relief device 100 can be inserted through an opening 205 in mounting structure 200. The opening can be of a size configured to accept industry standard connector receptacles or couplings, thus expanding the flexibility of traditional mounting structures enabling the passage of an unbroken cable through the mounting structure as well as providing industry standard connector interfaces.

Strain relief device 100 can be inserted into opening 205 of the mounting structure 200 until the abutment ridges 121 of the strain relief devices rest against one face of the mounting structure. When the strain relief device is properly seated in the opening, the clips 160 will engage with the other side of the mounting structure to secure the strain relief device to the mounting structure.

The mounting structure can be formed on an outer wall of an enclosure or inserted into an enclosure. Strain relief device 100 provides a high density cable entry field. This is of particular interest for distribution boxes located in medium to large office buildings, hospitals, hotels or apartment buildings where there is a need to route cables to a large number of floors or sections within the building in order to provide service to several locations from a single access point. The exemplary mounting structure can be contained within a demarcation box, a floor distribution box, an in-house distribution box, a wireless demarcation box, or a fiber distribution box for construction market, or be a cable entrance portion for any telecommunication distribution box.

Alternatively, the exemplary strain relief device can be mounted in a network interface device (NID) or other small distribution enclosure for application in smaller buildings or single family homes.

In some instances, a patch panel can be place in any or the aforementioned telecommunication enclosures to allow optimal cabling and patch cord connections and flexibility. In this case the path panel can be partially populated with the exemplary strain relief devices and the remaining room can have optical fiber connector couplings and/or copper based communication sockets (e.g. RJ style communication receptacles).

The exemplary strain relief device helps to prevent microbending signal losses which can occur when cables are secured in racks, cabinets or enclosures by some conventional methods such as cable ties or by clamping on the outer cable jacket or sheath. Advantageously, the exemplary strain relief devices can be easily and quickly installed, and can be easily re-entered and re-used multiple times without seal degradation.

Various modifications including extending the use of the exemplary sealing members to applications with optical fiber telecommunication drop cables, copper telecommunication drop cables or copper coax drop cables, equivalent processes, as well as numerous structures to which the present invention may be applicable will be readily apparent to those of skill in the art to which the present invention is directed upon review of the present specification.

What is claimed is:

1. A strain relief device to allow the passage of at least one telecommunication cable therethrough, comprising:

a one piece, rectangular tubular body having an outer surface and at least one cable channel extending between a first end of the rectangular tubular body and a second end rectangular tubular body;

an external strength member securing section to secure strength members from the at least one telecommunication cable to the rectangular tubular body; and a sealing member to provide an environmental seal between the at least one telecommunication cable and the strain relief device and between the strain relief device and a mounting structure into which the strain relief device is inserted.

2. The strain relief device of claim 1, further comprising a pair of clips disposed on opposite sides of the outer surface to secure the strain relief device into an opening in a standard telecommunication patch panel.

3. The strain relief device of claim 1, wherein the strain relief device has two cable channels extending between a first open end of the rectangular tubular body, wherein each cable channel is configured to hold one telecommunication cable.

4. The strain relief device of claim 1, further comprising a pair of abutment ridges formed on the outer surface of two opposite sides of the rectangular tubular body.

5. The strain relief device of claim 1, wherein the external strength member holding section comprises a mechanical fastener to secure one or more strength members of the at least one telecommunication cable.

6. The strain relief device of claim 1, further comprising a plurality of sealing members to provide an environmental seal between the at least one telecommunication cable and the strain relief device and between the strain relief device and a mounting structure into which the strain relief device is inserted.

7. The strain relief device of claim 6, where in the plurality of sealing members comprises an internal sealing member disposed in the at least one cable channel and an external sealing member disposed in a groove formed in the outer surface of the rectangular tubular body.

8. The strain relief device of claim 1, where in the sealing member is of a single contiguous construction.

9. The strain relief device of claim 8, wherein the sealing member includes a frame portion disposed on the outer surface of the rectangular tubular body and one or more inner sealing rings disposed in the cable channels passing through the strain relief device.

10. The strain relief device of claim 1, wherein the rectangular tubular body is symmetric around a midplane of the strain relief device.

11. The strain relief device of claim 1, wherein the rectangular tubular body is configured to have the same dimensions and shape as a standard SC-format optical connector coupling.

12. The strain relief device of claim 1, wherein the rectangular tubular body is configured to have the same dimensions and shape as a standard LC-format optical connector coupling.

13. The strain relief device of claim 1 mounted in a mounting structure.

14. The strain relief device of claim 13, wherein the mounting structure is one of a patch panel and a cable entrance portion of a telecommunication distribution box.

* * * * *